United States Patent
Castillo (10) Patent No.: US 11,905,962 B2
(45) Date of Patent: Feb. 20, 2024

(54) VEHICLE EXHAUST DISSIPATION SYSTEM FOR IMPROVED LIDAR DETECTION

(71) Applicant: Toyota Research Institute, Inc., Los Altos, CA (US)

(72) Inventor: Rafael Castillo, Los Altos, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 0 days.

(21) Appl. No.: 17/676,440

(22) Filed: Feb. 21, 2022

(65) Prior Publication Data

US 2023/0265857 A1 Aug. 24, 2023

(51) Int. Cl.
 F04D 27/00 (2006.01)
 F01N 13/08 (2010.01)
 G01S 17/931 (2020.01)

(52) U.S. Cl.
 CPC ......... F04D 27/004 (2013.01); F01N 13/082 (2013.01); G01S 17/931 (2020.01)

(58) Field of Classification Search
 CPC ....... F01N 13/082; F01N 1/18; F01N 2290/06
 See application file for complete search history.

(56) References Cited

U.S. PATENT DOCUMENTS

| | | | | |
|---|---|---|---|---|
| 4,897,068 A | * | 1/1990 | Jackson | A63H 33/40 446/217 |
| 8,479,498 B2 | * | 7/2013 | Smith | F01N 3/021 60/297 |
| 8,556,014 B2 | * | 10/2013 | Smith | B60K 11/04 180/68.1 |
| 8,869,516 B2 | * | 10/2014 | Smith | F01N 3/05 60/297 |
| 10,415,445 B2 | * | 9/2019 | Decker | F01N 13/082 |
| 11,603,833 B2 | * | 3/2023 | Brown | F04B 39/121 |
| 2006/0070789 A1 | | 4/2006 | Dirkson | |
| 2007/0039318 A1 | | 2/2007 | Krajewski et al. | |
| 2009/0139218 A1 | * | 6/2009 | Davis | F01N 3/34 60/320 |
| 2012/0048631 A1 | * | 3/2012 | Shatters | B60K 11/00 180/68.1 |
| 2012/0102918 A1 | * | 5/2012 | Smith | F01N 3/05 60/273 |
| 2012/0102919 A1 | * | 5/2012 | Smith | F01P 7/04 60/287 |

FOREIGN PATENT DOCUMENTS

CN 2525257 Y 12/2002

* cited by examiner

*Primary Examiner* — Anthony Ayala Delgado
(74) *Attorney, Agent, or Firm* — Christopher G. Darrow; Darrow Mustafa PC (57) ABSTRACT

A vehicle exhaust dissipation system includes a fan unit and one or more processors. A memory is communicably coupled to the one or more processors and stores a fan control module including computer-readable instructions that when executed by the processor(s) cause the processor(s) to, responsive to a determination that an ambient temperature is equal to or below a fan rotor activation temperature, control operation of the fan unit to generate an airflow directed into an exhaust gas exiting the vehicle from a vehicle exhaust opening.

16 Claims, 6 Drawing Sheets

VEHICLE EXHAUST DISSIPATION SYSTEM FOR IMPROVED LIDAR DETECTION

TECHNICAL FIELD

The subject matter described herein relates to management of vehicle exhaust and, more particularly, to a vehicle exhaust dissipation system designed to help dissipate exhaust gases exiting a tailpipe of a vehicle.

BACKGROUND

During cold weather, water vapor contained in vehicle exhaust fumes exiting a tailpipe of a first vehicle may condense to form a visible vapor. Under certain conditions, this vapor may be thick and relatively static, and may form an exhaust "cloud" obscuring portions of a rear end of the emitting (first) vehicle. This vapor may interfere with LIDAR scans of the first vehicle by a LIDAR sensor mounted in a second vehicle following behind the first vehicle. In some cases, the exhaust from the first vehicle may cause the second vehicle LIDAR sensor to detect objects that are not actually present.

SUMMARY

In one aspect of the embodiments described herein, a vehicle exhaust dissipation system is provided. The system includes a fan unit and one or more processors. A memory is communicably coupled to the one or more processors and stores a fan control module including computer-readable instructions that when executed by the processor(s) cause the processor(s) to, responsive to a determination that an ambient temperature is equal to or below a fan rotor activation temperature, control operation of the fan unit to generate an airflow directed into an exhaust gas exiting the vehicle from a vehicle exhaust opening.

In another aspect of the embodiments described herein, a vehicle exhaust dissipation system is provided. The system includes a fan unit having a rotor, the fan unit being structured to be positionable to generate an airflow into exhaust gas exiting an exhaust gas opening of a vehicle. The system includes one or more processors and a memory communicably coupled to the one or more processors. The memory stores a fan control module including computer-readable instructions that when executed by the processor(s) cause the processor(s) to generate an airflow directed into the exhaust gas exiting the exhaust gas opening; responsive to an increase in a flowrate of the exhaust toward the exhaust opening, control operation of the fan unit to increase a rotation speed of the rotor; and, responsive to a decrease in a flowrate of the exhaust toward the exhaust opening, control operation of the fan unit to decrease a rotation speed of the rotor.

In yet another aspect of the embodiments described herein, a method of dispersing an exhaust gas exiting a vehicle exhaust gas opening is provided. The method includes a step of, responsive to a determination that an ambient temperature is equal to or below a fan rotor activation temperature, controlling operation of a fan unit to generate an airflow directed into the exhaust gas exiting the exhaust gas opening.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Embodiments described herein relate to a vehicle exhaust dissipation system configured to dissipate exhaust gases emitted by a vehicle. The system may be may include a fan unit. The fan unit may include a fan rotor configured to direct an airflow into an exhaust gas stream emanating from a vehicle tailpipe. The system may be configured to, responsive to a determination that an ambient temperature is equal to or below a fan rotor activation temperature, control operation of the fan unit to generate the airflow directed into the exhaust gas, thereby dissipating the exhaust. In some arrangements, the system may be configured to, responsive to an increase in a flowrate of the exhaust gas, control operation of the fan unit to increase a rotation speed of the rotor and, responsive to a decrease in the flowrate of the exhaust toward the exhaust opening, control operation of the fan unit to decrease a rotation speed of the rotor. In particular arrangements, the system may be configured to control a rotation speed of the rotor so as to be proportional to a flowrate of the exhaust gas exiting the tailpipe. Use of a vehicle exhaust dissipation system as described herein may help dissipate exhaust fumes emitted by a first vehicle, to improve detection of the first vehicle by a LIDAR sensor located in a second vehicle following behind the first vehicle.

Referring to FIGS. 1-6, examples of a vehicle exhaust dissipation system 100 are illustrated. Some of the possible elements of the vehicle exhaust dissipation system 100 are shown in FIGS. 1-6 and will be described with reference thereto. Additionally, it will be appreciated that for simplicity and clarity of illustration, where appropriate, reference numerals may have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

Figure 1:
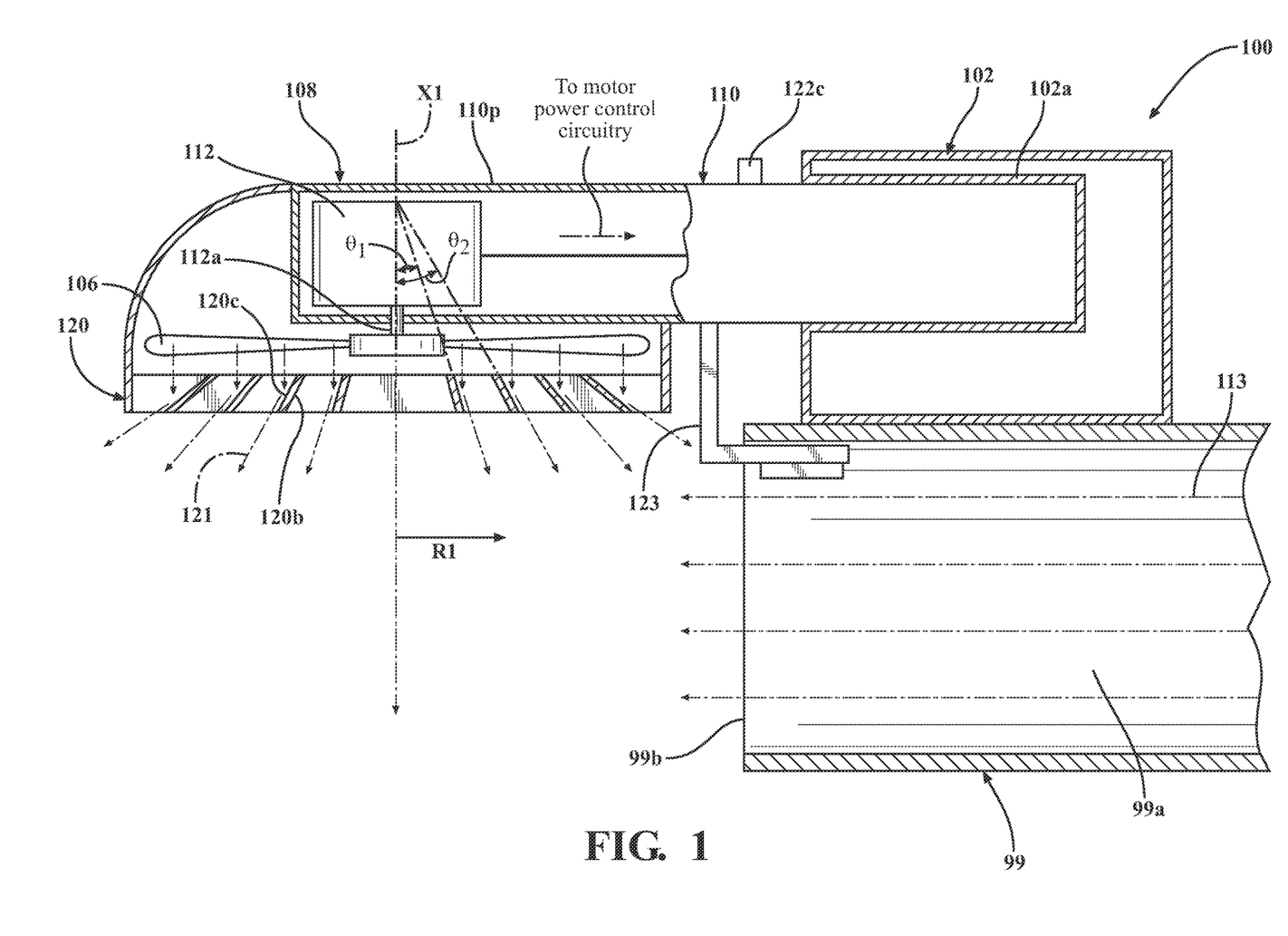
FIG. 1 is a schematic cross-sectional side view of an embodiment of a vehicle exhaust dissipation system shown mounted to an exhaust gas outlet of a vehicle (in this case, a vehicle tailpipe).

FIG. 1 is a schematic cross-sectional side view of an embodiment 100 of a vehicle exhaust dissipation system shown mounted to an exhaust gas outlet 99 of a vehicle (in this case, a vehicle tailpipe). An exhaust gas passage 99a may be a passage (such as defined by a vehicle tailpipe) through which the vehicle exhaust gas flows to reach the environment exterior of the vehicle. An exhaust gas opening 99b may be an opening (such as tailpipe opening shown in FIG. 1) leading from an associated exhaust gas passage 99a to the environment exterior of the vehicle. An exhaust gas outlet 99 may include the exhaust gas passage 99a (and structure defining it) and an associated exhaust gas opening 99b.

As used herein, a "vehicle" is any form of motorized transport. In one or more implementations, the vehicle is a conventional passenger vehicle. While arrangements will be described herein with respect to passenger vehicles, it will be understood that embodiments are not limited to passenger vehicles. In some implementations, the vehicle may be any form of motorized transport that benefits from the functionality of the vehicle exhaust dissipation system discussed herein.

Referring to FIG. 1, in one or more arrangements, the vehicle exhaust dissipation system 100 may include a mounting base 102 structured to enable mounting of a fan unit 104 thereto. The mounting base 102 may be structured to be detachably securable to the vehicle exhaust gas outlet 99 (in this case, a vehicle tailpipe) or to another portion of a vehicle proximate the exhaust gas outlet.

The mounting base 102 may be secured to the exhaust gas outlet 99 using a hose clamp or any other suitable method enabling a direction of the airflow generated by a rotor 106 of a fan unit 108 (described in greater detail below) to be adjusted as desired. For example, the mounting base 102 may be mountable to the exhaust gas outlet 99 so that an airflow generated by a fan unit mounted to the mounting base 102 may be directed downwardly toward a road surface, toward either side of the vehicle, or in any other desired direction.

The mounting base 102 may include a cavity 102a structured for receiving therein the fan unit 108, as described in greater detail herein. The mounting base 102 and the fan unit 108 may be structured so that the fan unit 108 is removably securable inside the mounting base cavity 102a for use. This enables a user to easily attach the fan unit 108 to the vehicle and to remove the fan unit when not in use, to minimize the risk of damage to the fan unit 108 and to replace its batteries. A latch or other securement system (not shown) may be incorporated into one of the mounting base 102 or the fan unit 108 and may be structured to engage a complementary latching feature provided on the other one of the mounting base 102 and the fan unit 108, to secure the fan unit 108 to the mounting base 102 during vehicle use.

Figure 2:
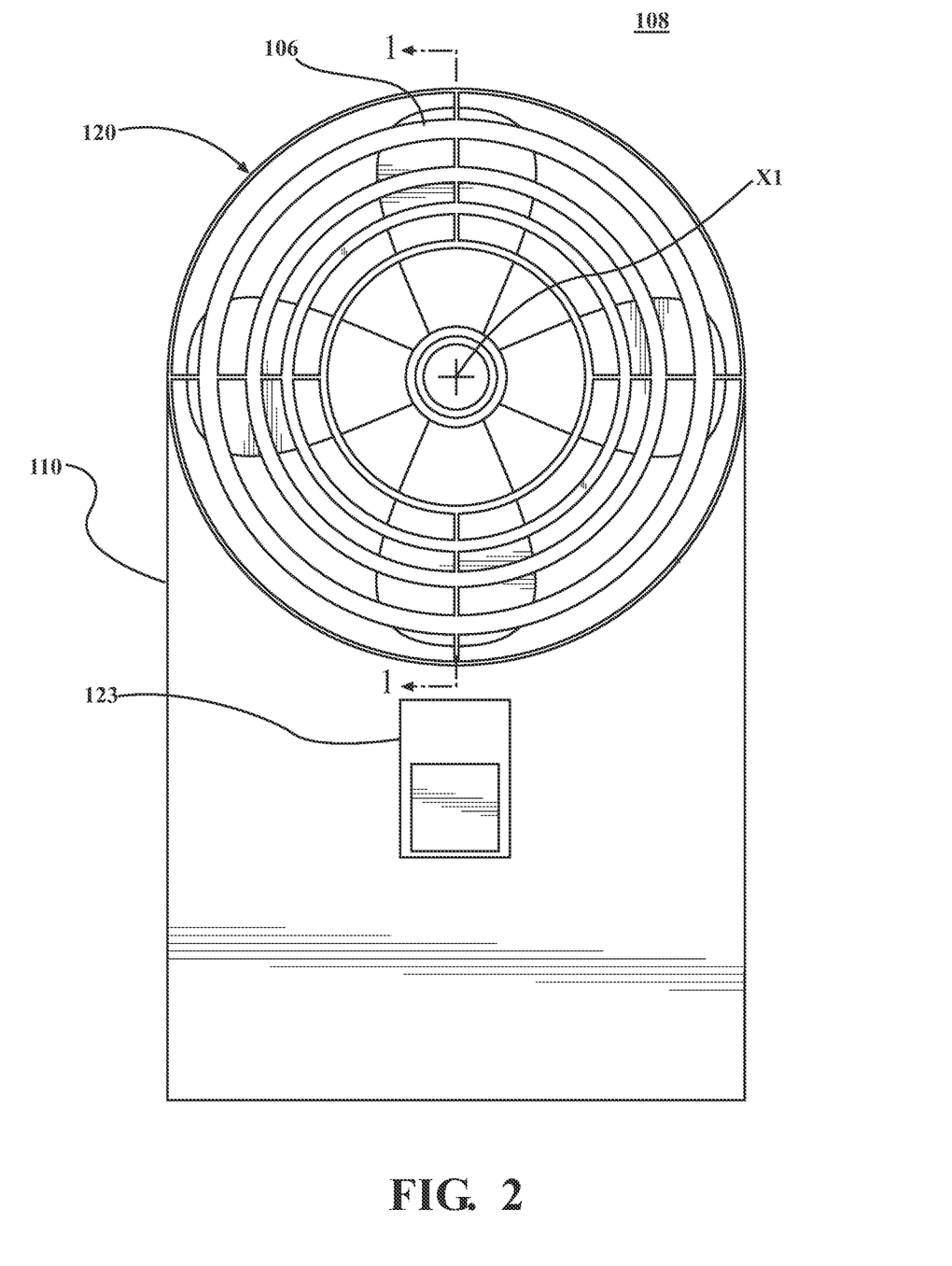
FIG. 2 is a schematic front view of a fan unit of the vehicle exhaust dissipation system of FIG. 1, in accordance with an embodiment described herein.
Figure 3:
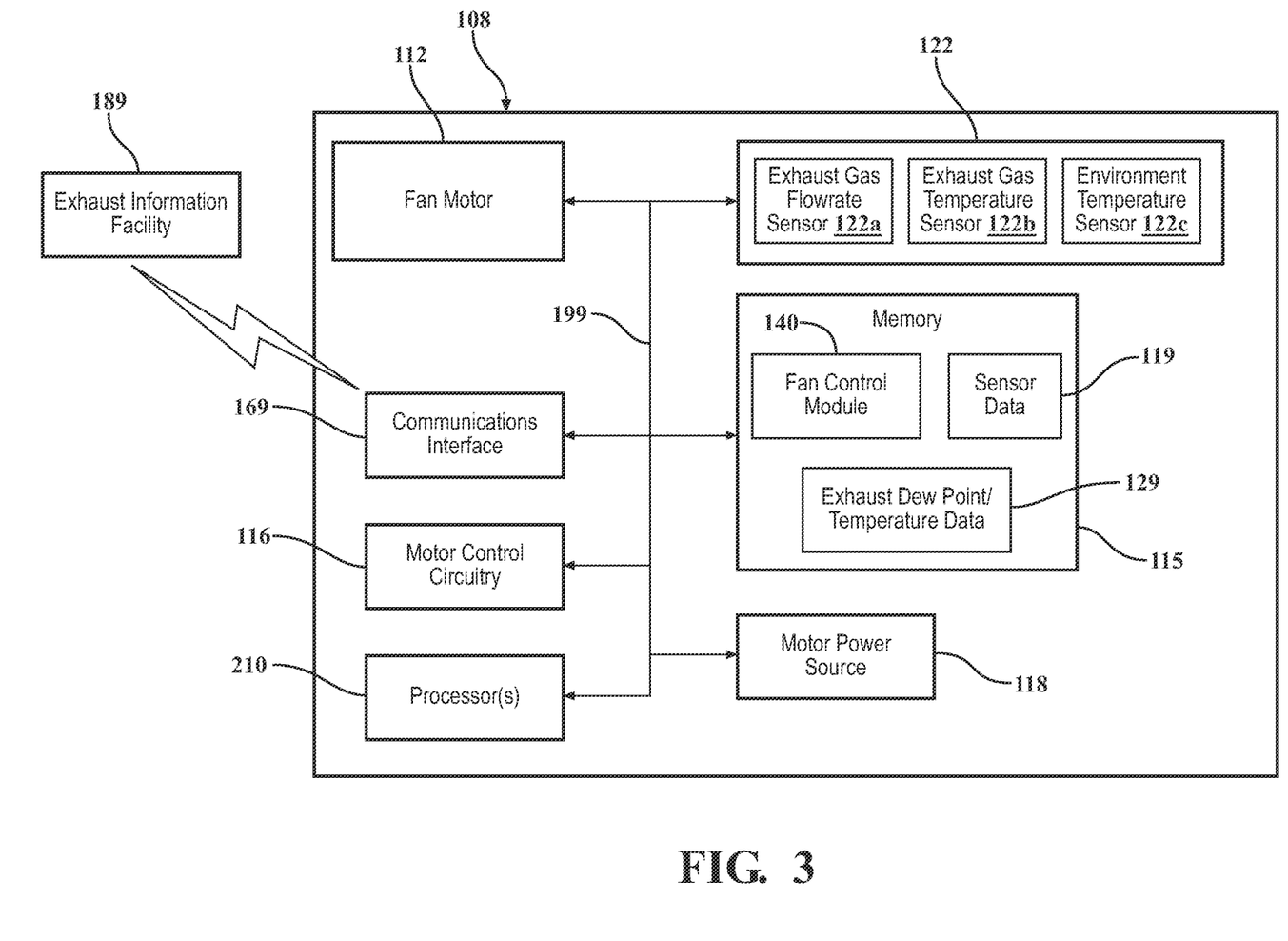
FIG. 3 is a block schematic diagram of the fan unit shown in FIG. 2.

FIG. 2 is a schematic front view of a fan unit of the vehicle exhaust dissipation system of FIG. 1, in accordance with an embodiment described herein. FIG. 3 is a block schematic diagram of the fan unit shown in FIG. 2.

The fan unit 108 may include a housing 110 structured to house and/or support components of the vehicle exhaust dissipation system 100. The housing 110 may be formed from one or more metallic, polymeric, and/or any other suitable material or materials. The fan unit 108 may include a motor 112 configured for rotating the rotor 106 to generate an airflow directable into a stream 113 of exhaust gas (FIG. 1) exiting an exhaust opening 99b of the vehicle, as described herein. In one or more arrangements, the motor 112 may be a variable-speed motor whose speed is controllable in a known manner by adjusting the voltage to the motor (using a potentiometer, for example). In one or more arrangements, the motor 112 may be structured and connected so that a rotation speed of the motor output shaft may be controlled by motor control circuitry 116 to any value within a range of RPM values for the purposes described herein.

Fan rotor 106 may be operably connected to the motor 112 so that the rotor receives energy from the rotating motor output shaft 112a and transmits it to the exhaust stream 113, thereby generating an airflow directable into the exhaust stream. Rotor 106 may have a central, rotational axis X1. In the embodiment shown in the drawings, axis X1 is also a rotational axis of the motor output shaft.

In one or more arrangements, the fan unit 108 may be mounted to the vehicle so that the airflow generated by the rotating rotor 106 may be directed vertically downwardly, toward a road surface on which the vehicle resides. However, the fan unit 108 and rotor 106 may be adjustable to direct an airflow in any desired direction by adjusting the fan unit mounting position and/or an orientation in which the mounting base 102 is secured to the vehicle.

In the embodiment shown in FIGS. 1-3, the rotor 106 is powered by direct attachment to the motor output shaft 112a. In alternative arrangements, the motor 112 may rotate the rotor 106 by means of a suitable power train (such as a belt drive, for example) interposed between and operably connecting the motor 112 and the rotor 106.

The motor 112 may be operably connected to motor control circuitry 116 configured to implement motor control functions such as "on-off" switching, variation of voltage applied to the motor 112, and other parameters pertinent operation of the motor as described herein. Operation of the motor control circuitry 116 may be responsive to control commands received from the fan control module 140.

The vehicle exhaust dissipation system 100 may include a power source 118 configured to power the motor 112 and other operations of the fan unit. In one or more arrangements, the power source 118 may be one or more batteries, such as conventional dry cell batteries. In other arrangements, the vehicle exhaust dissipation system 100 and the vehicle may be configured (using transformer(s) and suitable power supply circuitry) to enable the vehicle exhaust dissipation system to electrically connect to the vehicle, to draw power directly from a portion of the vehicle.

Referring to FIGS. 1 and 2, the vehicle exhaust dissipation system 100 may include a diffuser 120 attachable to the housing 110. The diffuser 120 may be designed to disperse or scatter an airflow propelled by the rotor 106 through the diffuser. This serves to scatter the exhaust emanating from the exhaust gas opening 99b. In one or more arrangements, the diffuser 120 may define a grating 120a including plurality of angled grating sections 120b. The grating 120a may be structured so that an angle formed between a respective exhaust gas guiding surface 120c of each grating section 120b and the central axis X1 of the fan rotor 106 increases with an increasing radial distance (in a direction R1) of the grating section from the central axis X1. This structure creates multiple airstreams moving through the exhaust stream 113 in slightly different directions, helping to more widely scatter the exhaust stream 113. Thus, for example, the exhaust gas direction angle $\theta_2$ is greater than the exhaust gas direction angle $\theta_1$.

Referring to FIG. 3, the vehicle exhaust dissipation system 100 may include one or more sensors 122 incorporated into and/or extending from housing 110. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor(s) to keep up with some external process. In arrangements in which the sensors 122 include a plurality of sensors, the sensors can work independently from each other. Alternatively, two or more of the sensors can work in combination with each other. In such cases, the two or more sensors can form a sensor network. The sensors 122 can be operably connected to the processor(s) 210, the memory 115, and/or to any other element(s) of the fan unit 108 via a bus 199.

The sensors 122 can include any suitable type of sensor. Various examples of different types of sensors will be described herein. However, it will be understood that the embodiments are not limited to the particular sensors described. The sensors 122 may include any sensors suitable for and/or required to perform any of the data acquisition and/or control operations contemplated herein.

Sensors 122 may be communicably coupled to the various components of the fan unit 108. The sensors 122 may be operably connected to the fan unit wireless communications interface 169 for transmission of information to a cloud or other storage and/or processing facility or for vehicle-to-vehicle (V2V) or vehicle-to-everything (V2X) communications.

In one or more arrangements, portions of one or more of the sensors 122 may be configured to be insertable into the exhaust passage 99a when the fan unit 108 is mounted to the vehicle. When positioned inside the exhaust passage 99a, the portions of the one or more sensors 122 may gather data relating to the exhaust gas flowing toward the exhaust opening 99b. In one or more arrangements, for purposes of inserting portions of the sensors 122 into the exhaust passage 99a, at least portions of the one or more of sensors 122 may be enclosed or mounted in a sensor stalk 123 extending from the housing 110 and designed to support, protect, and guide sensing portions of the sensors 122. As seen in FIG. 1, a portion of the sensor stalk 123 may be inserted into the exhaust passage 99a during insertion of the housing 110 into the mounting base cavity 102a to mount the fan unit 108 to the vehicle.

In some arrangements, the one or more sensors 122 may include an exhaust gas flowrate sensor 122a configured to determine a flowrate of exhaust gas toward the exhaust gas opening 99a. Measurements of exhaust flowrate may be used in a manner described herein to control the rotation speed of the fan rotor 106. Sensor stalk 123 may incorporate a sensing portion of the flowrate sensor 122a for insertion into the exhaust gas flow passage 99a.

In some arrangements, the one or more sensors 122 may include an exhaust gas temperature sensor 122b configured to determine a temperature of the exhaust gas. The temperature of the exhaust gas may be used in estimating a dewpoint temperature of the exhaust gas, for purposes of assigning a fan rotor activation temperature to the vehicle exhaust dissipation system 100. Sensor stalk 123 may incorporate a sensing portion of the exhaust gas temperature sensor 122b for insertion into the exhaust gas flow passage 99a.

In some embodiments of the vehicle exhaust dissipation system, the sensors 122 incorporated into the system may include an environment temperature sensor 122c configured to measure an ambient temperature for comparison with a fan rotor activation temperature of the exhaust dissipation system 100. The ambient temperature may be a temperature of the environment exterior of the vehicle in direct physical contact with the vehicle and surrounding the vehicle out to a predetermined distance from the vehicle. The portion of the environment temperature sensor 122c that acquires ambient temperature data may be positioned at a location that minimizes interference of vehicle heat sources (such as the vehicle exhaust) with the temperature readings.

Referring to FIG. 1, in one example, the environment temperature sensor 122c may be positioned along (or extend from) what would be an upper surface 110p of the housing 110 when the housing is mounted in the mounting base 102 with the fan rotor 106 oriented to generate a vertically downward flow of air. In alternative arrangements, the exhaust dissipation system 100 may receive an ambient temperature reading from a temperature sensor located remotely from the housing 110 of the system 100 (for example, a sensor on another part of the vehicle)(not shown). In other alternative arrangements, the exhaust dissipation system 100 may receive an ambient temperature reading from an extra-vehicular sensor (not shown) positioned in an area local to where the vehicle currently resides. Temperature readings from sensors not included in the exhaust dissipation system 100 may be received through a wireless communications interface incorporated into the system. This communications interface may also be configured to receive control commands from a user (e.g., via a cellular device) and to transmit and receive any information relating to operations of the exhaust dissipation system 100 as described herein.

The vehicle exhaust dissipation system 100 can include one or more processors 210. For instance, the processor(s) 210 can be an electronic control unit (ECU) of the vehicle exhaust dissipation system 100.

The vehicle wireless communications interface 169 may be configured to enable and/or facilitate communication between elements of the vehicle exhaust dissipation system 100 and entities (such as cloud facilities, cellular and other mobile communications devices, other vehicles, remote servers, pedestrians, etc.) exterior of the vehicle. Wireless communications interface 169 may be configured to facilitate, establish, maintain, and end wireless V2V and V2X communications with pertinent extra-vehicular entities, for example servers and entities located in the cloud, edge servers, and other information sources and entities. Information such as exhaust dewpoint data and other types of information may be transmitted and received via the communications interface 169. If required, wireless communications interface 169 may incorporate or be in communication with any network interfaces needed to communicate with any extra-vehicular entities and/or networks. The wireless communications interface 169 may be configured to enable receipt of information and fan control commands from outside the vehicle exhaust dissipation system. The interface may also be configured to enable transmission (and receipt) of sensor data and other information to other portions of the vehicle exhaust dissipation system 100 and/or to entities outside the vehicle (for example, to exhaust information facility 189).

The memory 115 can include volatile and/or non-volatile memory. The memory 115 may include random-access memory (RAM), read-only memory (ROM), a hard-disk drive, flash memory, PROM (Programmable Read-Only Memory), EPROM (Erasable Programmable Read-Only Memory), EEPROM (Electrically Erasable Programmable Read-Only Memory), registers, magnetic disks, optical disks, hard drives, and/or any other suitable storage medium, or any combination thereof and/or other memory suitable for storing the modules, data and other information described herein. In embodiments described herein, memory 115 may store a fan control module 140. Additional modules (not shown) may also be stored in memory 115. The fan control module 140 includes computer-readable instructions that when executed by the processor(s) 210, cause the processor(s) 210 to perform the various functions disclosed herein.

The memory 115 may store one or more types of data. The memory 115 can be operably connected to the processor(s) 210 to enable the processor(s) 210 to access and use the data. The term "operably connected," as used throughout this description, can include direct or indirect connections, including connections without direct physical contact.

The data stored in memory 115 can include sensor data 119. In this context, "sensor data" means any information about the sensors 122 that the vehicle exhaust dissipation system 100 is equipped with, including the capabilities and other information about such sensors. As an example, in one or more arrangements, the sensor data 119 can include information regarding the exhaust gas flowrate sensor 122a and the exhaust gas temperature sensor 122b.

The data stored in memory 115 can include exhaust gas dewpoint data and related information 129. As described herein, for purposes of determining a rotor activation temperature, an estimate of the exhaust gas dewpoint temperature may be generated with reference to exhaust analysis data, engine performance data, lookup tables, and other information relating to characteristics of vehicle exhaust produced by the same vehicle make, vehicle model, and engine model as the vehicle, data and other information derived from the last exhaust diagnostic or emissions test of the vehicle (if available), and any other pertinent information.

The information needed for estimating the dewpoint temperature of the exhaust gas flowing through the exhaust gas passage 99a may be stored in memory 115, in exhaust gas dewpoint/temperature data 129. The information may be accessed and operated on by processor(s) 210 to estimate dewpoint temperature of the exhaust gas. Alternatively, the necessary exhaust gas dewpoint information may be stored remotely, for example at an exhaust information facility 189. The exhaust information facility 189 may be configured to access and/or process relevant exhaust gas information and generate an estimate of the dewpoint temperature of exhaust gas flowing through the exhaust gas passage 99a. The exhaust information facility 189 may be configured to wirelessly communicate the estimated exhaust gas dewpoint temperature to the vehicle exhaust dissipation system 100, for use as a rotor activation temperature of the system.

The vehicle exhaust dissipation system 100 can include one or more modules, at least one of which is described herein. The module(s) can be implemented as computer-readable program code that, when executed by processor(s) 210, implement one or more of the various control operations and/or processes described herein. One or more of the module(s) can be a component of the processor(s) 210, or one or more of the modules can be executed on and/or distributed among other processing systems to which the processor(s) 210 is operably connected. The module(s) can include instructions (e.g., program logic) executable by the one or more processor(s) 210.

Generally, a module, as used herein, includes routines, programs, objects, components, data structures, and so on that perform particular tasks or implement particular data types. In further aspects, a memory (such as memory 115) generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions. In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle exhaust dissipation system 100 can include a fan control module 140. The processor(s) 210 and the fan control module 140 can be operably connected (via bus 199) to communicate with each other and with the other elements of the vehicle exhaust dissipation system 100. As described herein, the processor(s) 210 and the fan control module 140 may be operable to control activation and deactivation of the fan unit 108 and rotor 106, the rotation speed of the rotor 106, and other operational parameters of the system 100.

As described herein, the fan control module 140 may include computer-readable instructions that when executed by the processor(s) 210 causes the processor(s) to control activation and deactivation operations of the fan unit 108 (i.e., turning the fan unit 108 "on" and "off"). As described herein, the fan control module 140 may also include computer-readable instructions that when executed by the processor causes the processor to control activation and deactivation operations of the fan rotor 106 (i.e., turning the rotor 106 "on" and "off").

The fan control module 140 may include computer-readable instructions that when executed by the processor(s) 210 causes the processor(s) to determine, using sensor data from exhaust gas flowrate sensor 122a, if the vehicle engine is "on" or "off". In one or more arrangements, the vehicle engine may be determined to be "off" if the exhaust gas flowrate is currently zero or near-zero and has been zero or near-zero continuously for a predetermined amount of time. The engine may be determined to be "on" if the exhaust gas flowrate is above a predetermined non-zero threshold and has remained above the threshold continuously for a predetermined amount of time.

As described herein, the fan control module 140 may include computer-readable instructions that when executed by the processor(s) 210 causes the processor(s) to control a rotation speed of the fan rotor 106. The fan control module 140 may include computer-readable instructions that when executed by the processor(s) 210 causes the processor(s) to generate a "low-battery" condition alert signal when a power level of a battery powering the fan unit 108 falls to a predetermined level. A low battery level alert signal may be audible, visual, or a combination of both. The alert signal may be sent to a user cellular device, to a display in the vehicle passenger compartment, or to any of a variety of other receiving entities or (combination of entities) configured to receive the signal and covert the signal to a form designed to be perceivable by the user.

In arrangements described herein, the fan control module may include computer-readable instructions that when executed by the processor(s) 210 causes the processor(s) to, responsive to a determination that an ambient temperature is equal to or below an activation temperature, control operation of the fan unit to direct an airflow 121 into an exhaust gas exiting the vehicle from a vehicle exhaust opening. The activation temperature may be a temperature at which the fan control module activates the rotor to rotate the rotor and produce the airstream which is directed into the exhaust gas exiting the exhaust opening.

In one activation mode (i.e. a first manual activation mode), the rotor may be activated manually by a "rotor on" command generated by a user and deactivated manually by an "rotor off" command generated by a user, regardless of the ambient temperature. In this activation mode, the fan control module may include computer-readable instructions that when executed by the processor(s) 210 cause the processor(s) to automatically start rotation of the rotor at some predetermined or default rotation speed responsive to receipt of the "rotor on" command. The fan control module may also include computer-readable instructions that when executed by the processor(s) 210 cause the processor(s) to automatically stop rotation of the rotor responsive to receipt of the "rotor off" command.

In another arrangement, the system 100 may be configured to enable a user to command that the rotor 106 to automatically activate to rotate whenever the vehicle engine is turned on, as indicated by a flow of exhaust gas detected by the flowrate sensor 122a, and regardless of ambient temperature. As described herein, the system 100 may also be configured to enable a user to command that the rotor 106 and the fan unit 108 are to automatically deactivate after the vehicle engine has turned off (e.g., when the flowrate sensor 122a no longer detects exhaust gas flowing toward the exhaust gas opening 99b). This operational mode may be selected, for example, when a user knows that the ambient temperature will always or usually be low enough so that the vehicle exhaust will be visible. In this operational mode, the fan control module may be configured to control rotation of the rotor 106 at a constant speed. Alternatively, the fan control module 140 may be configured to control rotation of the rotor 106 at a rotation speed that is proportional to a flowrate of exhaust flowing toward the exhaust gas opening 99b as described herein.

The fan control module may include computer-readable instructions that when executed by the processor(s) 210 cause the processor(s) to activate the rotor 106 based on the vehicle engine being "on" and the ambient temperature being at or below an activation temperature of the rotor. The rotor activation temperature may be a temperature at or below which the rotor 106 is to be activated to rotate and generate an airstream directed into the vehicle exhaust stream 113.

In one or more arrangements, a default rotor activation temperature may be set manually by a user. For example, after the vehicle engine has been turned on, a user may personally inspect the exhaust gas opening 99b for exhaust gases which are visible after exiting the exhaust opening 99b. If the exhaust gases are visible after exiting the exhaust opening 99b, the user may generate a command to set the activation temperature of the rotor 106 to the current ambient temperature as determined by the exhaust gas temperature sensor 122b in the fan unit 108. The rotor 106 may then automatically activate when the engine is on and continue to operate as long as the ambient temperature is at or below the selected rotor activation temperature. Alternatively, the system 100 may be configured to enable a user to simply enter (for example, via a numerical keypad) a rotor activation temperature at and below which the rotor is to automatically activate whenever the vehicle engine is on.

The fan control module 140 may include computer-readable instructions that when executed by the processor(s) 210 cause the processor(s) to, after a user-specified rotor activation temperature is selected, start rotation of the rotor 106 whenever the vehicle engine is "on" and the ambient temperature is at or below the rotor activation temperature. The fan control module 140 may also include computer-readable instructions that when executed by the processor(s) 210 cause the processor(s) to discontinue rotation of the rotor whenever the ambient temperature is above the rotor activation temperature, and to turn the fan unit "off" whenever the vehicle engine is turned "off".

In one or more arrangements, the rotor activation temperature is an estimated dew point temperature of the exhaust gas, and the fan unit automatically activates when the engine is turned "on" and the ambient temperature is at or below the estimated dew point temperature. The enhanced visibility of exhaust gas at relatively low temperatures may be due to the presence of water vapor in the gas. Water vapor is a by-product of the fuel combustion process. A dewpoint temperature of the exhaust gas is a temperature at which water vapor contained in the exhaust gas starts to condense. The condensate will be in the form of a visible vapor or steam. Thus, since the exhaust gas becomes visible when cooled to its dewpoint, battery power may be conserved by activating the fan only when the ambient temperature is equal to or below the exhaust gas dewpoint temperature.

The dewpoint temperature of the exhaust gas may depend on the water vapor content of the gas, the chemical composition of the gas, the temperature of the gas, and other factors. Exhaust gas may have a complex chemical makeup, and the chemical composition of the gas may change over time depending on the grade of fuel burned, the condition of the vehicle engine and associated components, and other factors. Thus, a precise estimate of the exhaust gas dewpoint temperature at any given time may be difficult without real time analysis of the exhaust gas using an automotive exhaust gas analyzer operably connected to the vehicle exhaust system for structured testing. However, in one or more arrangements of the exhaust dissipation system, for purposes of determining a rotor activation temperature, an estimate of the exhaust gas dewpoint temperature may be generated with reference to exhaust gas analysis data, engine performance data, lookup tables, and other information relating to characteristics of vehicle exhaust produced by the same vehicle make, vehicle model, and engine model as the vehicle, data and other information derived from the last exhaust diagnostic or emissions test of the vehicle (if available), and any other pertinent information. Real time information (such as the current exhaust gas temperature) pertinent to the estimate of exhaust gas dewpoint temperature may be determined by the exhaust gas temperature sensor 122b, stored in a memory, and transmitted to the exhaust information facility 189 or another facility capable of generating an estimate of exhaust gas temperature. Using such information and one or more suitable algorithms and/or other analytical tools, an exhaust information facility 189 may calculate or otherwise determine an average value or a usable approximate value of the exhaust gas dewpoint temperature. An exhaust information facility 189 may be any facility capable of storing and processing information usable for estimating exhaust dewpoint temperature(s) of one or more make(s) and model(s) of vehicle(s). The facility 189 may also be configured to communicate wirelessly with a vehicle to provide an estimated exhaust dewpoint temperature to the exhaust dissipation system responsive to a request from the vehicle.

In one or more arrangements, the motor 112 may be controlled to operate at the same speed under all operating conditions (i.e., the motor output shaft/rotor may rotate at a constant speed under all conditions). In one or more other arrangements, the fan control module 140 may include computer-readable instructions that when executed by the processor(s) 210 cause the one or more processor(s) to, responsive to an increase in a flowrate of the exhaust toward the exhaust opening 99b, control operation of the fan unit 108 to increase a rotation speed of the rotor 106 and, responsive to a decrease in a flowrate of the exhaust toward the exhaust opening, control operation of the fan unit to decrease a rotation speed of the rotor. The ability to vary the rotor rotation speed in accordance with a change in the exhaust gas flow rate through the exhaust gas passage 99a and/or out of the exhaust opening 99b may provide more effective scattering of the exhaust when the exhaust flowrate is relatively greater, while conserving power and battery life to the greatest extent when the flowrate is relatively lower.

In particular control arrangements, the fan control module 140 may include computer-readable instructions that when executed by the one or more processor(s) 210 cause the one or more processor(s) to control a rotation speed of the rotor 106 so as to be proportional to a flowrate of exhaust toward the exhaust opening 99b. For example, in one or more arrangements, a range of motor speeds (RPM) may be selected over which the motor 112 will operate. The selected motor speed range may include a minimum operational speed and a maximum operational speed. Similarly, a range of exhaust flowrates through and out of the exhaust opening 99b may be selected. The exhaust flowrate may have a minimum value (for example, in feet$^3$/minute, or CFM) when the vehicle engine is turned on and idling with the vehicle static, and with no pressure applied to the accelerator pedal. The exhaust flowrate may have a maximum value corresponding to a specific engine RPM or vehicle speed (for example, 40 MPH). The values in the range of motor speeds may be "mapped to" or correlated with the values in the range of exhaust flowrates so that an operational speed of the motor is proportional to the exhaust flowrate within the respective ranges of the motor speed and the exhaust flowrate. The correlations may be stored in a lookup table in memory, for example.

In one non-restrictive example, a minimum operational speed of the fan motor may be 30 RPM and a maximum operational speed may be 100 RPM, for a range of 70 RPM. Exhaust flowrate CFM at engine idle may be 10 CFM and exhaust flowrate at MPH may be 30 CFM. In this case, a proportion of fan motor speed to exhaust flowrate may be 70 RPM/20 CFM=3.5 RPM/CFM. Thus, in the example described, the fan motor speed may be increased or decreased at a rate of 3.5 RPM corresponding to each increase or decrease in flowrate of 1 CFM. Upper and lower limit fan motor speed values and associated exhaust flowrate limits and the associated proportional to be used for fan motor control may be estimated and/or derived, for example, by experimentation by testing. Alternative output shaft/rotor speed control schemes (either proportional or non-proportional) may also be used.

In the manner described above, the fan control module 140 may control a rotation speed of the rotor 106 so that the rotation speed has a proportional relationship with the exhaust flowrate (i.e., the motor output shaft/rotor rotation speed may vary directly with the exhaust flowrate). To this effect this control, the fan control module 140 may include computer-readable instructions that when executed by the one or more processor(s) 210 cause the one or more processor(s) to control a rotation speed of the rotor 106 so as to be proportional to a flowrate of exhaust toward the exhaust opening 99b.

Figure 4:
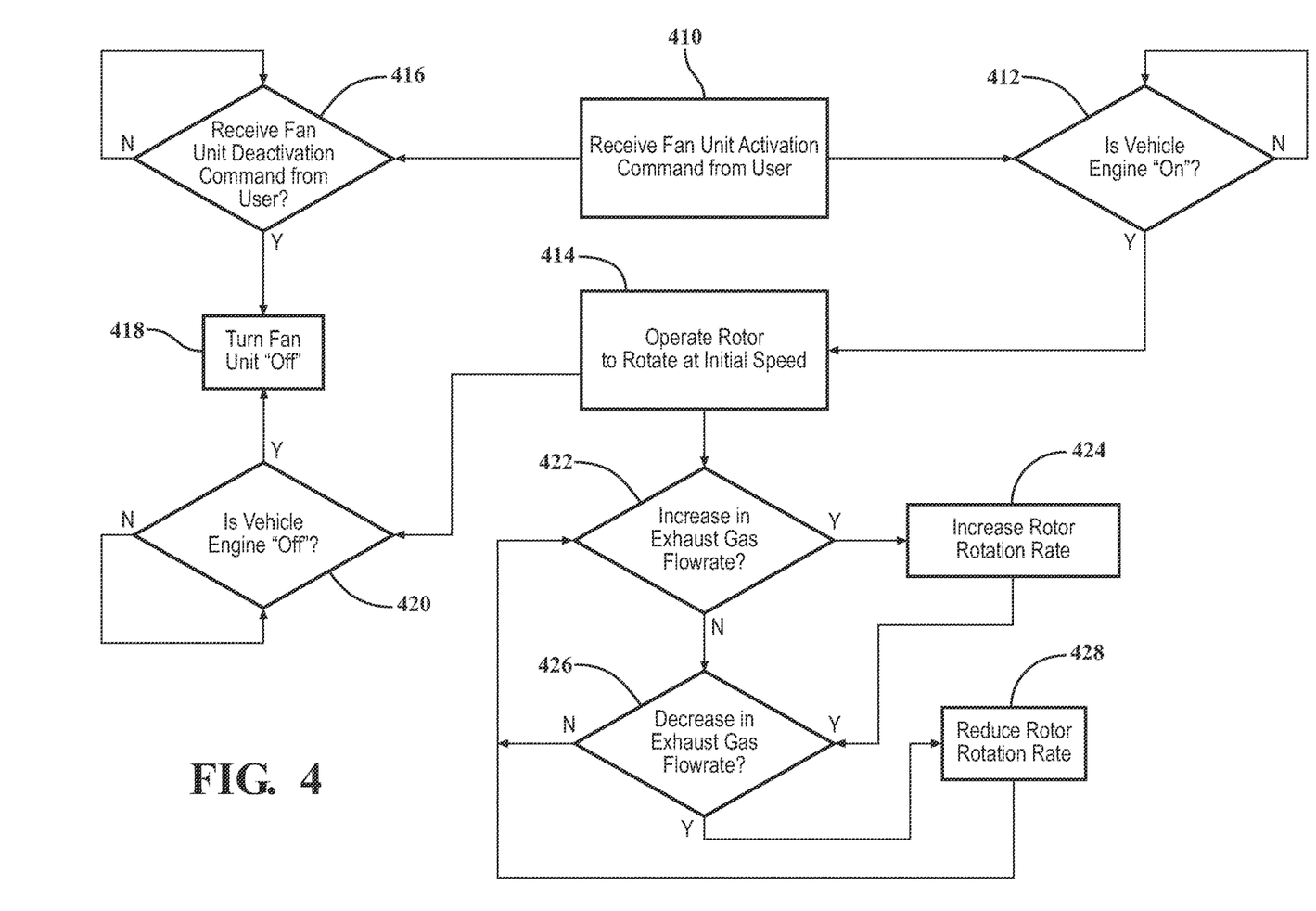
FIG. 4 is a flow diagram illustrating operation of a fan unit in accordance with an embodiment described herein.

FIG. 4 is a flow diagram illustrating operation of a fan unit in accordance with an embodiment described herein. Referring to FIG. 4, the fan unit control module 140 may (in block 410) receive a fan unit activation command from a user. When the fan unit is activated or turned "on", the fan unit control module 140 may generate commands controlling operation of the fan unit 108, including the provision of power to the motor 112 for powering the rotor 106 upon occurrence of any of the operational conditions described herein. When the fan unit 108 is deactivated or turned "off", no power may be directed to the fan motor 112.

Responsive to receipt of a fan activation command, the fan unit control module 140 may (in block 412) determine if the vehicle engine is "on". If the vehicle engine is not "on", the fan unit control module 140 may wait for flowrate sensor data indicating that the engine is "on". Responsive to receipt of the fan activation command, the fan unit control module 140 may also (in block 416) start to continuously or periodically check for a fan unit deactivation signal from a user. If a fan unit deactivation signal is received from the user before the vehicle engine is turned "on", the fan unit control module 140 may (in block 418) turn "off" the fan unit 108 to deactivate the fan unit responsive to the user's command.

Returning to block 412, if the vehicle engine is "on", the fan unit control module 140 may (in block 414) control operation of the fan unit motor 112 to rotate the rotor 106 at an initial speed. In certain arrangements, the motor 112 may be configured to operate at a single speed regardless of exhaust gas flowrate, and the initial speed may be a constant, single operational speed of the motor 112. In such an embodiment, the motor 112 would operate to rotate the rotor 106 at a constant speed whenever the motor is "on", and control flow would not proceed to blocks 422-428 (described below). In arrangements in which the rotor rotation speed is to be varied in accordance with the exhaust gas flowrate, the initial rotor rotation speed may be a rotation speed which is proportional to the exhaust flowrate as previously described.

After start of rotation of the rotor 106 at the initial speed, the fan unit control module 140 may (in block 420) monitor the exhaust flowrate to determine if the vehicle engine has been turned "off". If the engine is turned "off" at any time after starting rotation of the rotor 106 at the initial speed, the fan unit control module 140 may (in block 418) control operation of the fan unit to turn "off" the fan unit 108.

Also, after start of rotation of the rotor 106 at the initial speed, the fan unit control module 140 may (in blocks 422-428) continuously or periodically monitor flowrate sensor data for changes in the exhaust gas flowrate. Thus, if the exhaust gas flowrate has increased (block 422) from the initial value that prompted rotation of the rotor 106 at the initial rotation speed, the fan unit control module 140 may (in block 424) control operation of the motor 112 to increase the rotor rotation rate to more effectively disperse the greater quantity of exhaust gas flowing through the exhaust gas passage 99a. If the exhaust gas flowrate has not increased, control may transfer to block 426 to determine if the exhaust gas flowrate has decreased from the initial value that prompted rotation of the rotor 106 at the initial rotation speed. If the exhaust gas flowrate has decreased from the initial value that prompted rotation of the rotor 106 at the initial rotation speed, the fan unit control module 140 may (in block 428) control operation of the motor 112 to decrease the rotor rotation rate to conserve battery power. However, if the exhaust gas flowrate has not decreased, control may pass back to block 422, where the cycle of checking for changes in exhaust flowrate may continue until either the vehicle engine is turned "off" (block 420) or the a fan unit deactivation command is received from a user (block 416).

Figure 5:
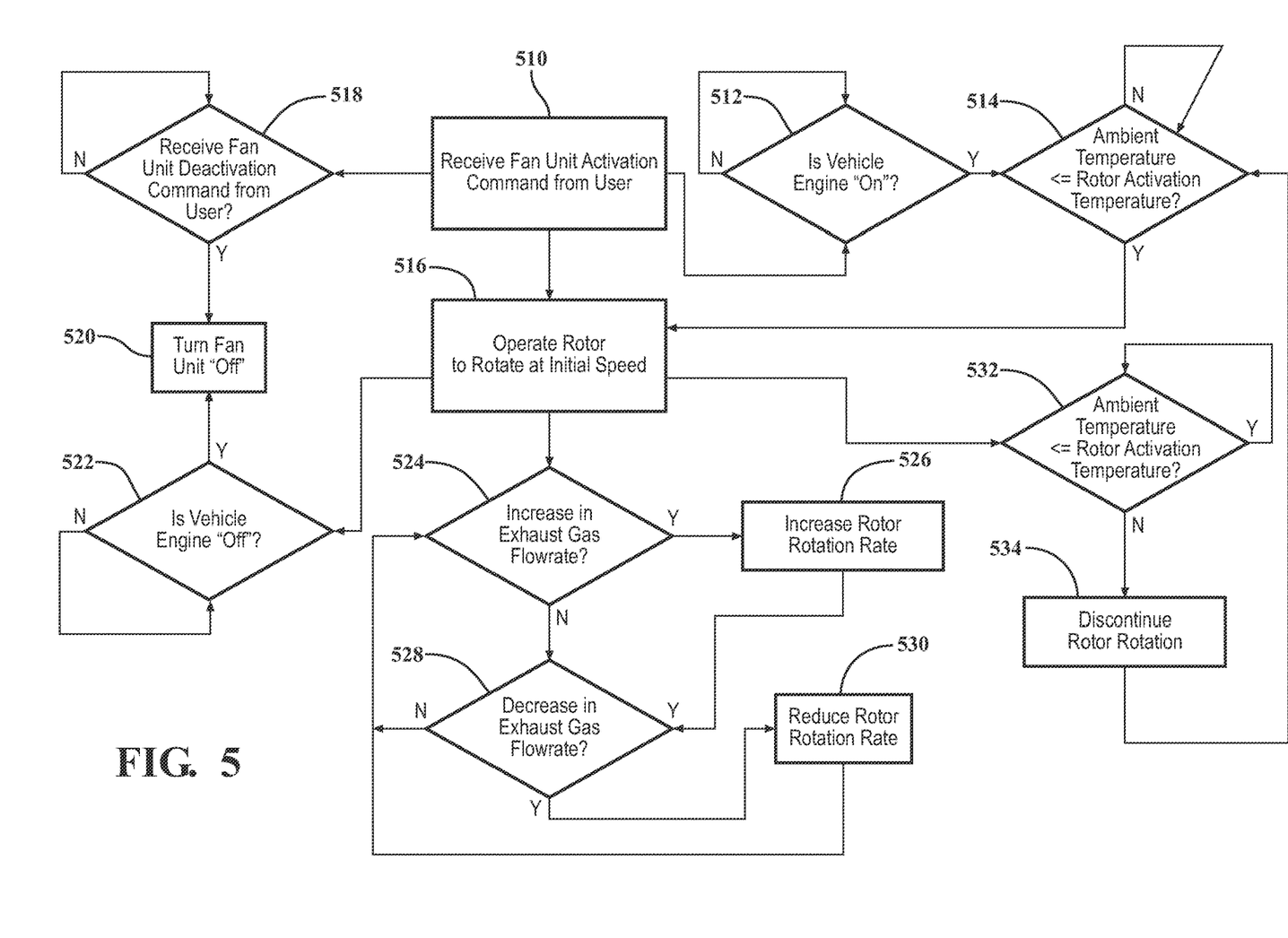
FIG. 5 is a flow diagram illustrating operation of a fan unit in accordance with another embodiment described herein.

FIG. 5 is a flow diagram illustrating operation of a fan unit in accordance with another embodiment described herein. Referring to FIG. 5, the fan unit control module 140 may (in block 610) receive a fan unit activation command from a user. When the fan unit is activated or turned "on", the fan unit control module 140 may generate commands controlling operation of the fan unit 108, including the provision of power to the motor 112 for powering the rotor 106 upon occurrence of any of the operational conditions described herein. When the fan unit 108 is deactivated or turned "off", no power may be directed to the fan motor 112.

Responsive to receipt of the fan unit activation command, the fan unit control module 140 may (in block 512) determine if the vehicle engine is "on". If the vehicle engine is not "on", the fan unit control module 140 may monitor for flowrate sensor data indicating that the engine is "on". Responsive to receipt of the fan unit activation command, the fan unit control module 140 may also (in block 518) start to continuously or periodically check for receipt of a fan unit deactivation signal from a user. If a fan unit deactivation signal is received from the user before the vehicle engine is turned "on", the fan unit control module 140 may (in block 520) turn "off" the fan unit 108 to deactivate the fan unit responsive to the user's command.

Returning to block 512, if the vehicle engine is "on", the fan unit control module 140 may (in block 514) determine (using temperature data from exhaust gas temperature sensor 122b and environment temperature sensor 122c) if the ambient temperature is equal to or less than a rotor activation temperature assigned to the exhaust gas. If the ambient temperature is not equal to or less than a rotor activation temperature assigned to the exhaust gas, the fan unit control module 140 may continue to monitor the difference between the ambient temperature and the rotor activation temperature for the stated condition. However, if the ambient temperature is equal to or less than a rotor activation temperature, the fan unit control module 140 may (in block 516) control operation of the fan unit motor 112 to rotate the rotor 106 at an initial speed.

In certain arrangements, the motor 112 may be configured to operate at a single speed regardless of exhaust gas flowrate, and the initial speed may be a constant operational speed of the motor. In such an embodiment, the motor 112 would operate to rotate the rotor at a constant speed whenever the motor is "on", and control flow would not proceed to blocks 524-530 (described below). In arrangements in which the rotor rotation speed is to be varied in accordance with the exhaust gas flowrate, the initial rotor rotation speed may be a rotation speed which is proportional to the exhaust flowrate as previously described.

After start of rotation of the rotor 106 at the initial speed, the fan unit control module 140 may (in block 522) start to monitor the exhaust flowrate to determine if the engine has been turned "off". If the engine is turned "off" at any time after starting rotation of the rotor 106 at the initial speed, the fan unit control module 140 may (in block 520) control operation of the fan unit 108 to turn the fan unit "off".

Also, after start of rotation of the rotor 106 at the initial speed in block 516, the fan unit control module 140 may (in blocks 524-530) continuously or periodically monitor flowrate sensor data for changes in the exhaust gas flowrate. Thus, if the exhaust gas flowrate has increased (block 524) from the initial value that prompted rotation of the rotor 106 at the initial rotation speed, the fan unit control module 140 may (in block 526) control operation of the motor 112 to increase the rotor rotation rate to more effectively disperse the greater quantity of exhaust gas flowing through the exhaust gas passage 99a.

If the exhaust gas flowrate has not increased, control may transfer to block 528 to determine if the exhaust gas flowrate has decreased from the initial value that prompted rotation of the rotor 106 at the initial rotation speed. If the exhaust gas flowrate has decreased from the initial value that prompted rotation of the rotor 106 at the initial rotation speed, the fan unit control module 140 may (in block 530) control operation of the motor 112 to decrease the rotor rotation rate to conserve battery power. However, if the exhaust gas flowrate has not decreased, control may pass back to block 524, where the cycle of checking for changes in exhaust flowrate may continue until either the vehicle engine is turned "off" (block 522) or a fan unit deactivation command is received from a user (block 518).

Also, after start of rotation of the rotor 106 at the initial speed in block 516, the fan unit control module 140 may (in block 532) continue to determine (using temperature data from exhaust gas temperature sensor 122b and environment temperature sensor 122c) if the ambient temperature is equal to or less than a rotor activation temperature assigned to the exhaust gas. If the ambient temperature is still equal to or less than a rotor activation temperature assigned to the exhaust gas, the fan unit control module 140 may continue to operate the motor 112 to rotate the rotor 106. However, after the start of rotation of the rotor in block 516, if the ambient temperature is no longer equal to or less than the rotor activation temperature, the fan unit control module 140 may (in block 534) control operation of the fan unit motor 112 to discontinue rotation of the rotor 106. Control may then pass back to block 514, where the fan unit control module 140 may continue to monitor the ambient temperature for the condition described therein.

Figure 6:
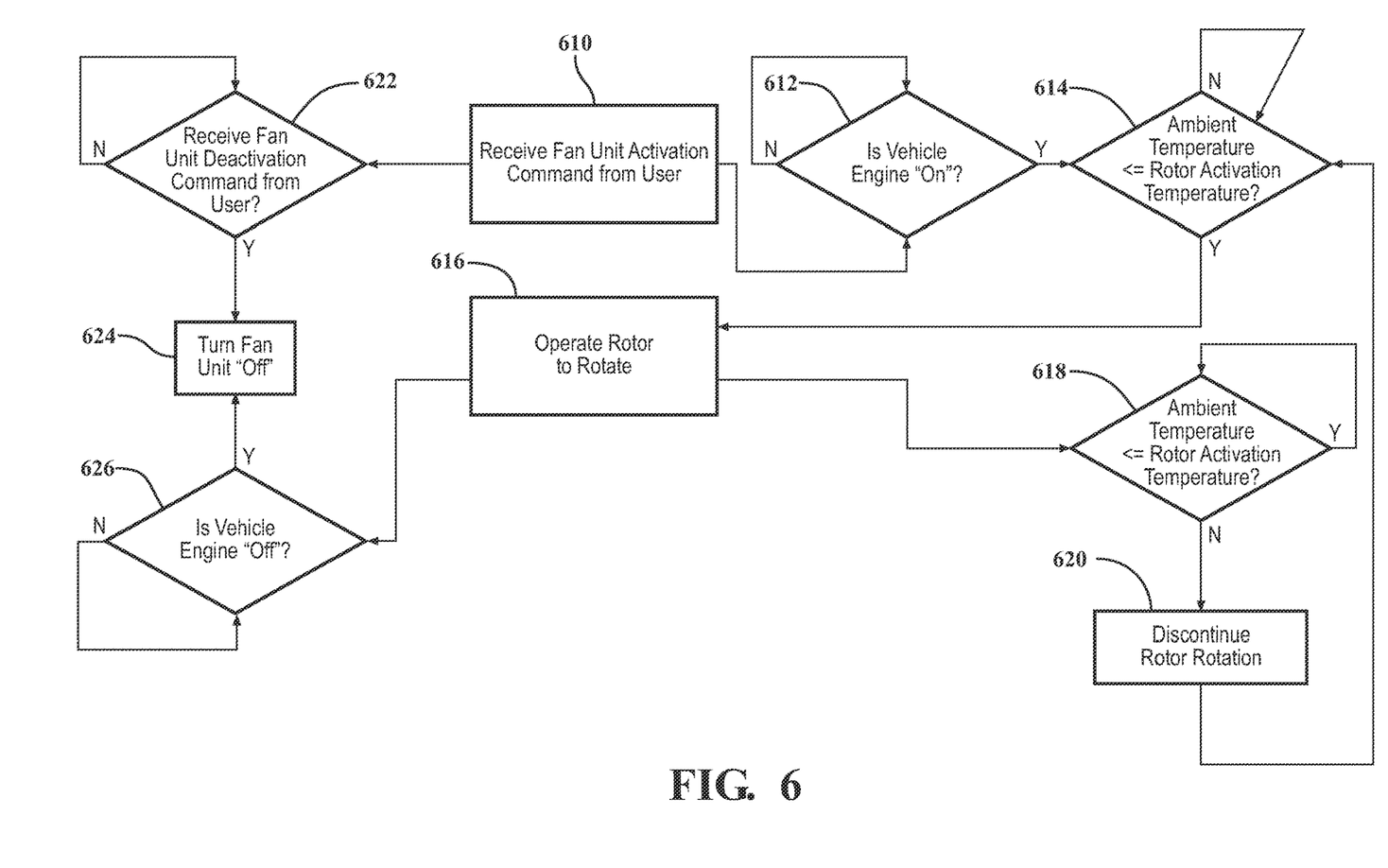
FIG. 6 is a flow diagram illustrating operation of a fan unit in accordance with yet another embodiment described herein.

FIG. 6 is a flow diagram illustrating operation of a fan unit in accordance with yet another embodiment described herein. Referring to FIG. 6, the fan unit control module 140 may (in block 610) receive a fan unit activation command from a user. When the fan unit 108 is activated or turned "on", the fan unit control module 140 may generate commands controlling operation of the fan unit 108, including the provision of power to the motor 112 for powering the rotor 106 upon occurrence of any of the operational conditions described herein. When the fan unit is deactivated or turned "off", no power may be directed to the fan motor 112.

Responsive to receipt of the fan unit activation command, the fan unit control module 140 may (in block 612) determine if the vehicle engine is "on". If the vehicle engine is not "on", the fan unit control module 140 may monitor for flowrate sensor data indicating that the engine is "on". Responsive to receipt of the fan unit activation command, the fan unit control module 140 may also (in block 622) start to continuously or periodically check for receipt of a fan unit deactivation signal from a user. If a fan unit deactivation signal is received from the user before the vehicle engine is turned "on", the fan unit control module 140 may (in block 624) turn "off" the fan unit 108 to deactivate the fan unit responsive to the user's command.

Returning to block 612, if the vehicle engine is "on", the fan unit control module 140 may (in block 614) determine (using temperature data from exhaust gas temperature sensor 122b and environment temperature sensor 122c) if the ambient temperature is equal to or less than a rotor activation temperature assigned to the exhaust gas. If the ambient temperature is not equal to or less than a rotor activation temperature assigned to the exhaust gas, the fan unit control module 140 may continue to monitor the difference between the ambient temperature and the rotor activation temperature for the stated condition. However, if the ambient temperature is equal to or less than a rotor activation temperature, the fan unit control module 140 may (in block 616) control operation of the fan unit motor 112 to rotate the rotor 106 at an initial speed.

In the embodiment represented in FIG. 6, the motor 112 may be configured to operate at a single speed regardless of exhaust gas flowrate. In such an embodiment, the motor 112 would operate to rotate the rotor at a constant speed whenever the motor is "on".

After start of rotation of the rotor 106 in block 616, the fan unit control module 140 may (in block 626) start to monitor the exhaust flowrate to determine if the engine has been turned "off". If the engine is turned "off" at any time after starting rotation of the rotor 106, the fan unit control module 140 may (in block 624) control operation of the fan unit 108 to turn the fan unit "off".

Also, after start of rotation of the rotor 106 at the initial speed in block 616, the fan unit control module 140 may (in block 618) continue to determine (using temperature data from exhaust gas temperature sensor 122b and environment temperature sensor 122c) if the ambient temperature is equal to or less than a rotor activation temperature assigned to the exhaust gas. If the ambient temperature is still equal to or less than a rotor activation temperature assigned to the exhaust gas, the fan unit control module 140 may continue to operate the motor 112 to rotate the rotor 106. However, after the start of rotation of the rotor in block 616, if the ambient temperature is no longer equal to or less than the rotor activation temperature, the fan unit control module 140 may (in block 620) control operation of the fan unit motor 112 to discontinue rotation of the rotor 106. Control may then pass back to block 614, where the fan unit control module 140 may continue to monitor the ambient temperature for the condition described therein.

In particular embodiments, the vehicle mounting the vehicle exhaust dissipation system may be a hybrid electric vehicle. In such cases, the fan unit control module 140 may be configured to leave the fan unit "on" after it has been turned on by a user, as long as the vehicle is either operating under power from the vehicle battery pack or the vehicle hydrocarbon-burning engine (i.e., when the vehicle is turned "on" and either idling or moving). The fan unit control module 140 may be configured to, when the vehicle is not turned "on" and either idling or moving, turn "off" the fan unit because it is assumed that, with the vehicle turned "off", the "start/stop" activity of the vehicle hydrocarbon-burning engine will no longer occur. The fan unit control module 140 may also be configured to control operation of the fan unit to cause the rotor 106 to rotate whenever the vehicle hydrocarbon-burning engine is turned "on", and to discontinue rotation of the rotor whenever the vehicle hydrocarbon-burning engine is turned "off".

Use of a vehicle exhaust dissipation system as described herein may help dissipate exhaust fumes emitted by a first vehicle, to improve detection of the first vehicle by a LIDAR sensor located in a second vehicle following behind the first vehicle.

In further aspects of the embodiments described herein, a method is provided for dispersing an exhaust gas exiting a vehicle exhaust gas opening. The method may include a step of, responsive to a determination that an ambient temperature is equal to or below a fan rotor activation temperature, controlling operation of a fan unit to generate an airflow directed into the exhaust gas exiting the exhaust gas opening.

In some arrangements, the method may further include steps of detecting an increase in a flowrate of exhaust gas toward the exhaust gas opening and, responsive to detecting the increase in the flowrate of the exhaust toward the exhaust opening, controlling operation of the fan unit to increase a rotation speed of a rotor of the fan unit to increase a flowrate of air into the exhaust gas exiting the exhaust gas opening.

In some arrangements, the method may further include steps of detecting a decrease in a flowrate of exhaust gas toward the exhaust gas opening and, responsive to detecting the decrease in the flowrate of the exhaust toward the exhaust opening, controlling operation of the fan unit to decrease a rotation speed of a rotor of the fan unit to decrease a flowrate of air into the exhaust gas exiting the exhaust gas opening.

In some arrangements, the fan assembly may include a rotor structured to be rotatable to generate the airflow, and the method may further include a step of controlling a rotation speed of a rotor of the fan unit so as to be proportional to a flowrate of exhaust toward the exhaust opening.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module, as envisioned by the present disclosure, is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A vehicle exhaust dissipation system comprising:
a fan unit;
one or more processors; and
a memory communicably coupled to the one or more processors and storing a fan control module including computer-readable instructions that when executed by the one or more processors cause the one or more processors to, responsive to a determination that an ambient temperature is equal to or below a fan rotor activation temperature, control operation of the fan unit to generate an airflow directed into an exhaust gas exiting a vehicle from a vehicle exhaust gas opening.

2. The system of claim 1, wherein the fan rotor activation temperature is an estimated dew point temperature of the exhaust gas.

3. The system of claim 2, further comprising a temperature sensor configured to determine a temperature of the exhaust gas prior to exiting the exhaust gas opening.

4. The system of claim 1, further comprising a sensor configured to determine a flowrate of exhaust gas toward the exhaust gas opening.

5. The system of claim 1 comprising a mounting base structured to be securable to a portion of the vehicle proximate the exhaust gas opening, and wherein the fan unit is structured to be removably securable to the mounting base.

6. The system of claim 1 wherein the fan unit comprises:
a rotor having a rotor central axis; and
a diffuser defining a grating including plurality of grating sections, the grating being structured so that an angle formed between a surface of each grating section and a central axis of a fan rotor of the fan unit increases with an increasing radial distance of the grating section from the central axis.

7. The system of claim 1 wherein the fan unit includes a fan rotor structured to be rotatable to generate the airflow, and wherein the fan control module includes computer-readable instructions that when executed by the one or more processors cause the one or more processors to:
responsive to an increase in a flowrate of the exhaust gas toward the exhaust gas opening, control operation of the fan unit to increase a rotation speed of the rotor; and responsive to a decrease in a flowrate of the exhaust gas toward the exhaust gas opening, control operation of the fan unit to decrease a rotation speed of the rotor.

8. The system of claim 1 wherein the fan unit includes a fan rotor structured to be rotatable to generate the airflow, and wherein the fan control module includes computer-readable instructions that when executed by the one or more processors cause the one or more processors to control a rotation speed of the rotor so as to be proportional to a flowrate of exhaust gas toward the exhaust gas opening.

9. A vehicle exhaust dissipation system comprising:
a fan unit including a rotor, the fan unit being structured to be positionable to generate an airflow into exhaust gas exiting an exhaust gas opening of a vehicle;
one or more processors; and
a memory communicably coupled to the one or more processors and storing a fan control module including computer-readable instructions that when executed by the one or more processors cause the one or more processors to:
generate an airflow directed into the exhaust gas exiting the exhaust gas opening;
responsive to an increase in a flowrate of the exhaust toward the exhaust opening, control operation of the fan unit to increase a rotation speed of the rotor; and
responsive to a decrease in a flowrate of the exhaust toward the exhaust opening, control operation of the fan unit to decrease a rotation speed of the rotor.

10. The system of claim 9, wherein the fan control module includes computer-readable instructions that when executed by the one or more processors cause the one or more processors to, responsive to a determination that an ambient temperature is equal to or below a fan rotor activation temperature, control operation of the fan unit to generate the airflow directed into the exhaust gas exiting the exhaust gas opening.

11. The system of claim 9 wherein the fan assembly includes a fan rotor structured to be rotatable to generate the airflow, and wherein the fan control module includes computer-readable instructions that when executed by the one or more processors cause the one or more processors to control a rotation speed of the rotor so as to be proportional to a flowrate of exhaust gas toward the exhaust gas opening.

12. A method of dispersing an exhaust gas exiting a vehicle exhaust gas opening, the method comprising a step of, responsive to a determination that an ambient temperature is equal to or below a fan rotor activation temperature, controlling operation of a fan unit to generate an airflow directed into the exhaust gas where the exhaust gas exits the vehicle exhaust gas opening.

13. The method of claim 12 further comprising steps of:
detecting an increase in a flowrate of exhaust gas toward the exhaust gas opening; and
responsive to detecting the increase in the flowrate of the exhaust gas toward the exhaust gas opening, controlling operation of a fan unit to increase a rotation speed of a fan rotor of the fan unit, to increase a flowrate of air into the exhaust gas exiting the exhaust gas opening.

14. The method of claim 12 further comprising steps of:
detecting a decrease in a flowrate of exhaust gas toward the exhaust gas opening; and
responsive to detecting the decrease in the flowrate of the exhaust gas toward the exhaust gas opening, controlling operation of a fan unit to decrease a rotation speed of a fan rotor of the fan unit, to decrease a flowrate of air into the exhaust gas exiting the exhaust gas opening.

15. The method of claim 12 wherein the fan unit includes a rotor structured to be rotatable to generate the airflow, and wherein the method further comprises a step of controlling a rotation speed of the rotor so as to be proportional to a flowrate of exhaust gas toward the exhaust gas opening.

16. The system of claim 1, wherein the vehicle exhaust dissipation system is mounted on a first vehicle, and wherein the first vehicle includes a wireless communications interface configured to receive control commands from other vehicles for operating the vehicle exhaust dissipation system.

* * * * *